United States Patent
Bank et al.

(10) Patent No.: US 8,122,433 B2
(45) Date of Patent: Feb. 21, 2012

(54) SOFTWARE DOCUMENTATION MANAGER

(75) Inventors: Judith H. Bank, Morrisville, NC (US);
Lisa M. Bradley, Cary, NC (US);
Belinda Y. Chang, Cary, NC (US);
Tamera L. Davis, Raleigh, NC (US);
Lin Sun, Morrisville, NC (US);
Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 11/738,874

(22) Filed: Apr. 23, 2007

(65) Prior Publication Data
US 2008/0263518 A1  Oct. 23, 2008

(51) Int. Cl.
*G06F 9/45* (2006.01)

(52) U.S. Cl. ........................................ 717/120

(58) Field of Classification Search ............... 717/120
See application file for complete search history.

(56) References Cited

U.S. PATENT DOCUMENTS

| | | | |
|---|---|---|---|
| 5,513,305 A | 4/1996 | Maghbouleh | |
| 6,208,345 B1 | 3/2001 | Sheard et al. | |
| 6,507,855 B1 * | 1/2003 | Stern | 715/234 |
| 7,194,679 B1 | 3/2007 | Green | |
| 7,334,219 B2 * | 2/2008 | Cebula et al. | 717/124 |
| 7,512,618 B2 | 3/2009 | Farchi et al. | |
| 7,788,640 B2 * | 8/2010 | Grimaldi | 717/123 |
| 2004/0078785 A1 | 4/2004 | Dutt et al. | |
| 2005/0060692 A1 | 3/2005 | Mansourov | |
| 2005/0229156 A1 | 10/2005 | Baumann | |
| 2009/0094580 A1 | 4/2009 | Bank et al. | |

OTHER PUBLICATIONS

Wang, R.—Non-final Office Action dated May 25, 2011, U.S. Appl. No. 11/867,173.

* cited by examiner

*Primary Examiner* — John Chavis
(74) *Attorney, Agent, or Firm* — Yudell Isidore Ng Russell PLLC

(57) ABSTRACT

A computer-implementable method and system for managing software code documentation is disclosed. The method receives computer software code and documentation selected by a user and inserts one or more association keys in the selected code and one or more association keys in the selected documentation. The association keys are used to identify a portion of computer software documentation that corresponds with the computer software code. When the user wants to see documentation for a section of code, or code that corresponds to a section of documentation, the user selects the relevant text. The method receives the selected text, retrieves the association keys inserted in the selected text, determines whether the selected text is code or documentation, searches for documentation or code with matching association keys and alters the display of the matching documentation or code.

5 Claims, 5 Drawing Sheets

FIG. 3

```
<Method-beginBattle-comment>
/*
 * Summary: Determine order of attacks, and process each battle
 * Parameters: Creature object representing attacker
 *             | Creature object representing defender
 * Return: Boolean indicating successful fight
 */
</Method-beginBattle-comment>

<Method-beginBattle>
function beginBattle(attacker, defender) {
            var isAlive;              // Boolean inidicating life or death after attack
            var teamCount;            // Loop counter // Check for pre-emptive strike
            if(defender.agility > attacker.agility) {
                        isAlive = defender.attack(attacker);
            }

// Continue original attack if still alive
            if(isAlive) {
                        isAlive = attacker.attack(defender);
            }

// See if any of the defenders teammates wish to counter attack
            for(teamCount = 0; teamCount < defender.team.length; i++) {
                        var teammate = defender.team[teamCount];
                        if(teammate.counterAttack = 1) {
                                    isAlive = teammate.attack(attacker);
                        }
            }

<Method-beginBattle.return-comment>
            // TODO: Process the logic that handles attacker or defender deaths
            </Method-beginBattle.return-comment>
            <Method-beginBattle.return>
            return true;
            </Method-beginBattle.return>
} // End beginBattle
</Method-beginBattle>
```

Application — File Edit View Tools Help 300, 302, 304, 306

SOFTWARE DOCUMENTATION MANAGER

BACKGROUND OF THE INVENTION

The present invention relates in general to the field of computers and similar technologies, and in particular to software utilized in this field. Still more particularly, the present disclosure relates to an improved method for tracking and displaying software documentation.

When creating software, writing code alone is insufficient to enable other programmers to quickly understand the purpose and function of that code. Proper form dictates that there should be some non-functional text along with the code that describes various aspects of its intended operation. Software Code Documentation (also known as Source Documentation or Comments) is written text that accompanies lines of code in computer software. Software documentation explains the function of a line of code or a group of lines of code and how it operates. This documentation is usually embedded within the source code itself so it is readily accessible to anyone who may be reading it.

Documentation in source code can be misleading and ambiguous. It is often difficult to determine the scope of a block of comment in a code fragment. In addition, modifications to the code can make the comment obsolete and confusing.

SUMMARY OF THE INVENTION

To address the problem described above, presently disclosed are a computer-implementable method, system and computer-usable medium for managing software code documentation. The method receives software code selected by a user and inserts one or more association keys in the selected code. The association keys are used to identify a portion of computer software documentation that corresponds with the computer software code. The method receives documentation entered by the user and inserts one or more association keys in the documentation. The association keys are used to identify a portion of code that corresponds with the documentation. When the user wants to see documentation for a section of code, or code that corresponds to a section of documentation, the user selects the relevant text. The method receives the selected text, retrieves the association keys inserted in the selected text and determines whether the selected text is code or documentation. If the text is code, the method searches for and alters the display of computer software documentation with a matching association key. If the text is documentation, the method searches for and alters the display of code with a matching association key.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 3 is a diagram of an exemplary user interface of a software code documentation manager in accordance with one or more aspects of this disclosure;

DETAILED DESCRIPTION OF THE PREFERRED EMBODIMENT

The present invention presents a method and system for managing software code documentation. One or more aspects of the present invention can be used for managing documentation for programming languages (such as C++), script languages (such as JavaScript®), markup languages (such as HTML and XML), workflow languages and other types of procedural languages. It is suited for, but not limited to, implementation in an integrated development environment. An integrated development environment (IDE), also known as integrated design environment and integrated debugging environment, is a type of computer software that assists computer programmers in developing software.

Figure 1:
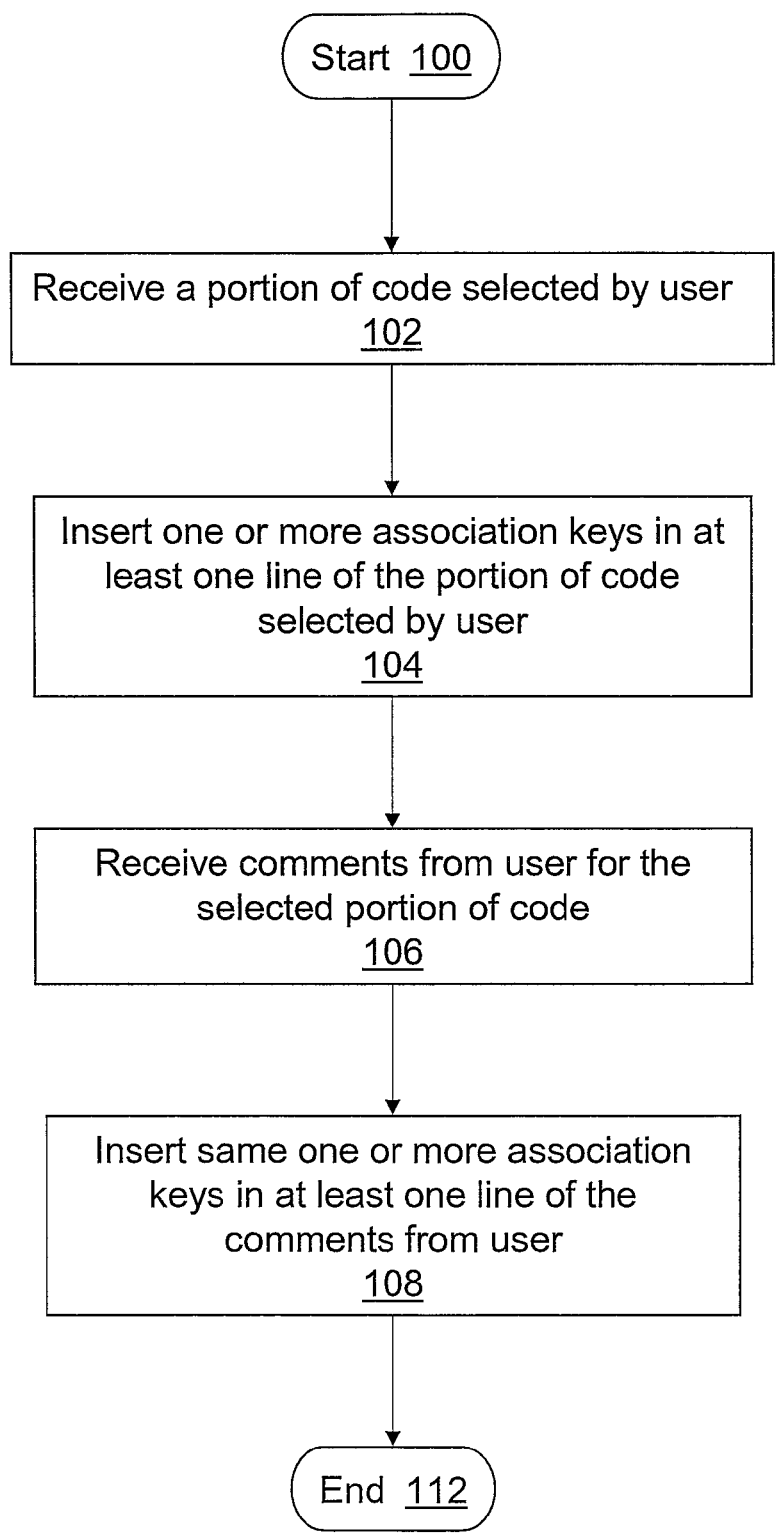
FIG. 1 is a flow-chart of exemplary steps taken to associate a block of software documentation with selected lines of computer software code.

With reference now to the figures, and in particular to FIG. 1, a flow-chart of exemplary steps taken to associate a block of software documentation (or comments) with selected lines of computer software code is shown. The process begins at initiator block 100. The user selects a portion of computer software code for which the user would like to add documentation. The process receives this selected portion of code (block 102) and inserts one or more association keys in at least one line of the selected portion of code (block 104). The association keys will be used to match the code with the comments that the user enters for that code. When the user enters documentation for the selected code, the process receives the documentation from the user for the selected portion of code (block 106) and inserts one or more association keys in at least one line of the selected portion of code (block 108). The association keys that are inserted are the same keys that are inserted in the related lines of code. In this manner, the documentation is paired with its associated lines of code. If a line of code is modified, the process may optionally prompt the user if a change should be made to the matching section of documentation. For example, the user may need to edit the functional description in the documentation, or the user may need to redefine the scope of the documentation (i.e. the lines of code with which the documentation is associated).

In a preferred embodiment, the association keys comprise a markup language tag (such as XML) or similar syntax to designate the start and end of the code associated with a particular comment. These tags would likewise be used to designate the start and end of the comments associated with that portion of code. The starting line of code would have a start tag, such as <tag1>, and the ending line of code would have an end tag, such as </tag1>. The number ("1" in this example) represents a unique identifier that can be used to match the code with its associated comment(s). Multiple comments can be nested for a particular section of code by inserting multiple tags, each associated with a particular comment.

In an alternative embodiment, association keys are inserted in each line of code to facilitate the addition or deletion of lines of code or comments without breaking the association. There is no need for a starting or ending tag. This way, any line can be deleted and each of the remaining lines will continue to have the same association key. Similarly, if a line of code or comments is added between two existing lines, the appropriate association keys merely need to be added to the new line, without having to redefine the block of code with which a particular comment is associated.

Figure 2:
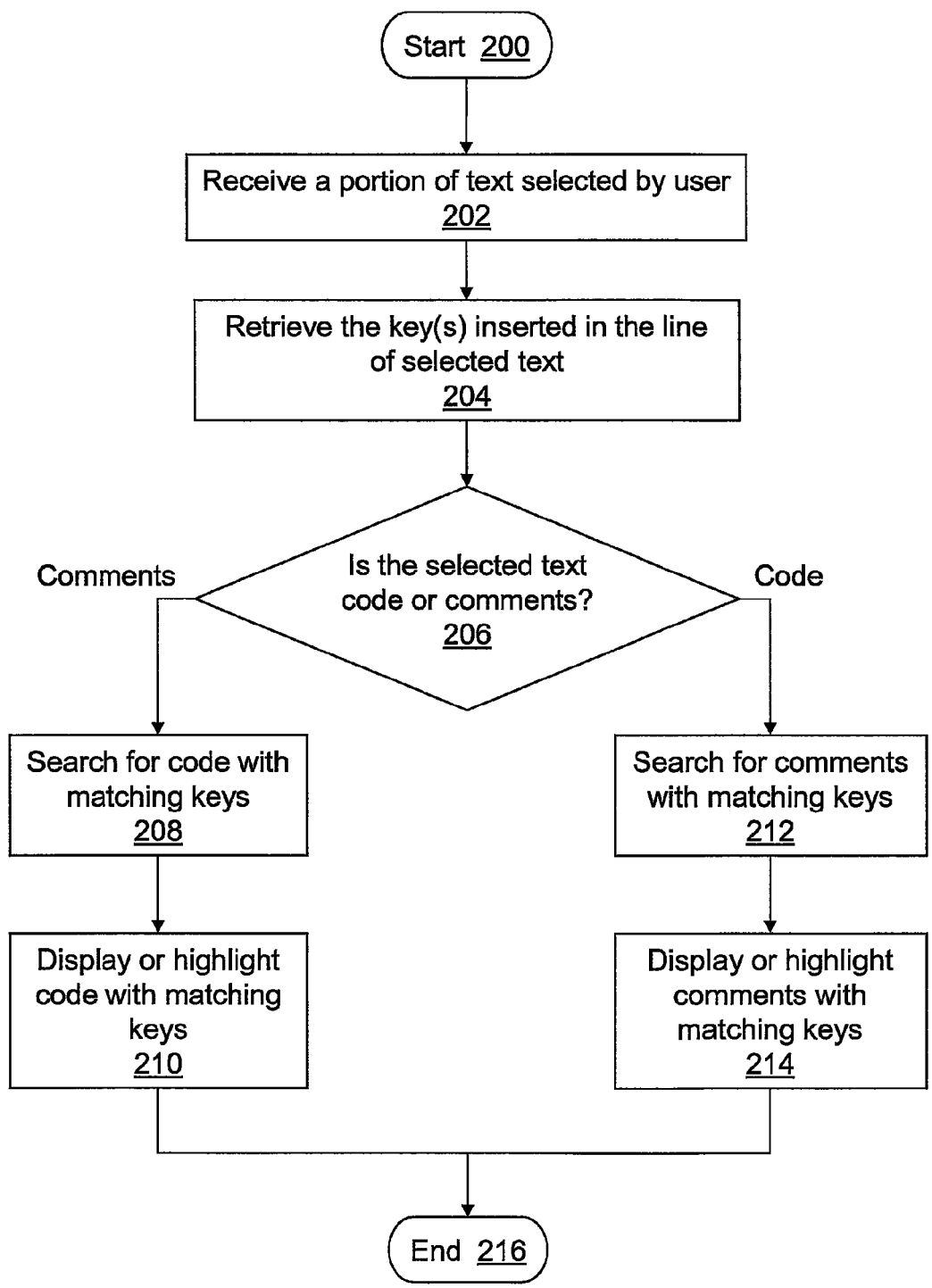
FIG. 2 is a flow-chart of exemplary steps taken to display software documentation associated with selective lines of code or, alternatively, to display lines of code associated with selected software documentation.

With reference now to FIG. 2, a flow-chart of exemplary steps taken to display software documentation associated with selective lines of code or, alternatively, to display lines of code associated with selected software documentation is shown. The process begins at initiator block 200. The user then selects a portion of code for which the user would like to see the associated documentation displayed, or the user selects a portion of documentation for which the user would like to see the associated code displayed. The process receives the selected text (code or documentation) selected by the user (block 202) and retrieves the association keys that are embedded in the selected text (block 204). The process determines whether the selected text comprises code or documentation (block 206). If the text is documentation, the process searches for lines of code with matching association keys (block 208) and highlights or otherwise alters the display of them (block 210). If the text is code, the process searches for documentation with matching association keys (block 212) and highlights or otherwise alters the display of them (block 214). The process ends at terminator block 216.

The user is able to select the type (or scope) of comments the user would like displayed. For example, a particular line of code may have comments associated with it in a hierarchical manner. There may be global comments that apply to the entire source file, comments that apply to all lines of code in a particular function within that source file, and comments that apply to the particular line of code within that function. The user may not wish to display global comments for the entire source file when selecting a line of code. The user can define a list of the type of comments the user would like to have displayed when a line of code is selected. The process receives this list and suppresses the display/highlighting of comments of this type when a matching line of code is selected.

With reference now to FIG. 3, a diagram of an exemplary user interface of a software code documentation manager in accordance with one or more aspects of this disclosure is shown. Application window 300 includes panel 302, where lines of software code and documentation are displayed. The user can select documentation in panel 302, for example, using input pointer 304. The selected documentation and matching lines of code corresponding to the selected documentation will be displayed with highlighting effect 306. This gives the user a quick and easy way to find out which lines of code are associated with a particular portion of documentation.

Figure 4:
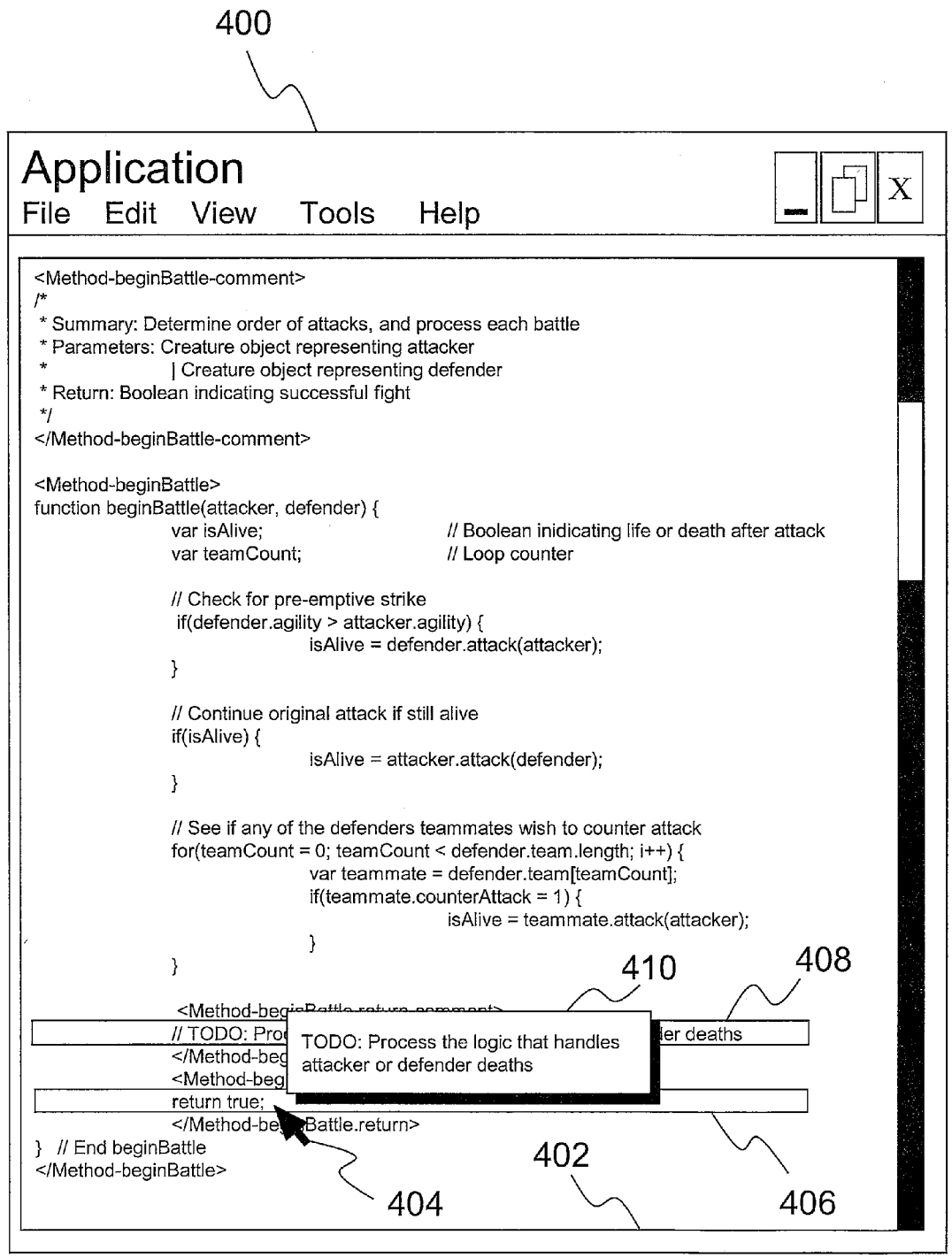
FIG. 4 is another diagram of an exemplary user interface of a software code documentation manager in accordance with one or more aspects of this disclosure.

With reference now to FIG. 4, another diagram of an exemplary user interface of a software code documentation manager in accordance with one or more aspects of this disclosure is shown. Just as a user can select documentation to find matching lines of code (as shown in FIG. 3), the user can select a line of code to find matching documentation. Application window 400 includes panel 402, where lines of software code and documentation are displayed. The user can select a line of code in panel 402, for example, using input pointer 404. The selected lines of code and matching documentation corresponding to the selected documentation will be displayed with highlighting effects 406 and 408. This gives the user a quick and easy way to find documentation that is associated with a particular line of code. This example demonstrates how lines of code and documentation are both highlighted when they are not adjacent to each other.

In addition, the user interface may include pop-up window 410. When the user holds input pointer 404 over a line of code in code panel 402 (displayed with highlighting effect 406), pop-up window 410 is displayed near input pointer 404. Matching software documentation for that line of code is displayed in pop-up window 410. This is particularly useful when the documentation for a selected line of code is separated from the code. This may frequently be the case when the display of global comments or nested comments of higher level is enabled. Pop-up window 410 enables to user to view the documentation without having to scroll up to display the highlighted documentation in panel 408. Pop-up window 410 can also be used to prompt the user to update documentation when lines of code are modified.

Figure 5:
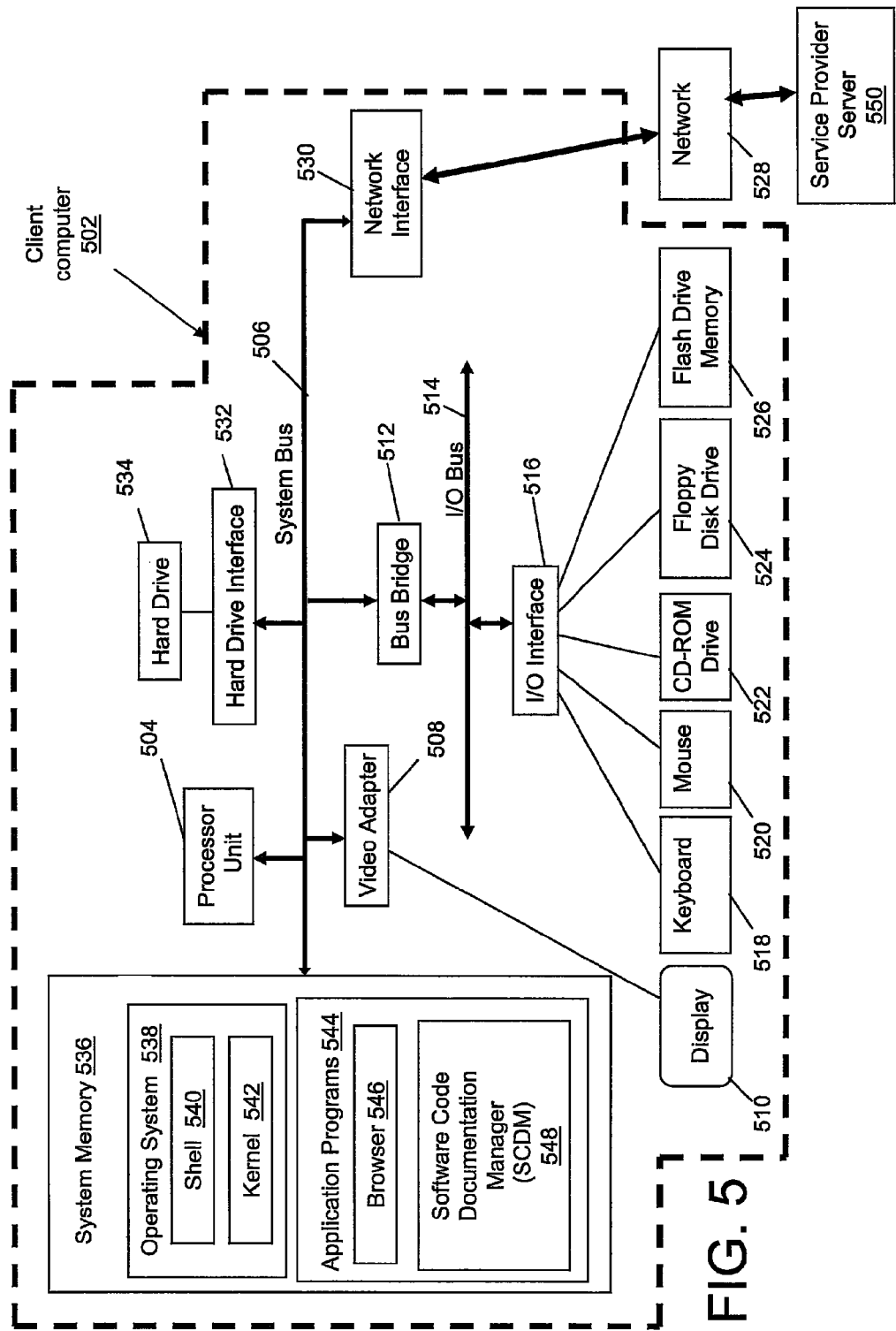
FIG. 5 depicts an exemplary computer in which the present invention may be implemented.

With reference now to FIG. 5, there is depicted a block diagram of an exemplary client computer 502, in which the present invention may be utilized. Client computer 502 includes a processor unit 504 that is coupled to a system bus 506. A video adapter 508, which drives/supports a display 510, is also coupled to system bus 506. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Client computer 502 is able to communicate with a service provider server 550 via a network 528 using a network interface 530, which is coupled to system bus 506. Network 528 may be an external network such as the Internet, or an internal network such as an Ethernet or a Virtual Private Network (VPN). Service provider server 550 may utilize a similar architecture design as that described for client computer 502.

A hard drive interface 532 is also coupled to system bus 506. Hard drive interface 532 interfaces with a hard drive 534. In a preferred embodiment, hard drive 534 populates a system memory 536, which is also coupled to system bus 506. Data that populates system memory 536 includes client computer 502's operating system (OS) 538 and application programs 544.

OS 538 includes a shell 540, for providing transparent user access to resources such as application programs 544. Generally, shell 540 is a program that provides an interpreter and an interface between the user and the operating system. More specifically, shell 540 executes commands that are entered into a command line user interface or from a file. Thus, shell 540 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 542) for processing. Note that while shell 540 is a text-based, line-oriented user interface, the present invention will equally well support other user interface modes, such as graphical, voice, gestural, etc.

As depicted, OS 538 also includes kernel 542, which includes lower levels of functionality for OS 538, including providing essential services required by other parts of OS 538 and application programs 544, including memory management, process and task management, disk management, and mouse and keyboard management.

Application programs 544 include a browser 546. Browser 546 includes program modules and instructions enabling a World Wide Web (WWW) client (i.e., client computer 502) to send and receive network messages to/from a server over the Internet using HyperText Transfer Protocol (HTTP) messaging, thus enabling communication with service provider server 550.

Application programs 544 in client computer 502's system memory also include a Software Code Documentation Manager (SCDM) 548, which includes logic for implementing the steps and UI's described above in FIGS. 1-4. In a preferred embodiment, service provider server 550 also has a copy of SCDM 548, which may be executed by or downloaded from service provider server 550, as described below. In one embodiment, client computer 502 is able to download SCDM 548 from service provider server 550.

The hardware elements depicted in client computer 502 are not intended to be exhaustive, but rather are representative to highlight essential components required by the present invention. For instance, client computer 502 may include alternate memory storage devices such as magnetic cassettes, Digital Versatile Disks (DVDs), Bernoulli cartridges, and the like. These and other variations are intended to be within the spirit and scope of the present invention.

As noted above, SCDM 548 can be downloaded to client computer 502 from service provider server 550. This deployment may be performed in an "on demand" basis manner, in which SCDM 548 is only deployed when needed by client computer 502. Note further that, in another preferred embodiment of the present invention, service provider server 550 performs all of the functions associated with the present invention (including execution of SCDM 548), thus freeing client computer 502 from using its resources. In another embodiment, process software for the method so described may be deployed to service provider server 550 by another service provider server (not shown). In yet another embodiment, SCDM 548 may be implemented through the use of a browser based application such as a Rich Internet Application (RIA). This RIA may be implemented in browser 546, preferably through the use of JavaScript such as AJAX (Asynchronous JavaScript using XML).

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implementable method comprising:
receiving a portion of computer software code selected by a user of a computer system;
inserting one or more association keys in at least one line of said portion of computer software code selected by said user, wherein said one or more association keys are used to identify a portion of computer software documentation that corresponds with said computer software code;
receiving computer software documentation from said user corresponding to said portion of computer software code selected by said user;
inserting one or more association keys in at least one line of said computer software documentation received from said user, wherein said one or more association keys are used to identify a portion of computer software code that corresponds with said computer software documentation;
receiving a portion of text selected by a user;
retrieving association keys in said portion of text selected by said user;
determining whether said portion of text selected by said user comprises computer program code or documentation;
in response to determining that said portion of text selected by said user comprises computer software code:
searching for computer software documentation with at least one matching association key; and
altering the display of said computer software documentation with said at least one matching association key; and
in response to determining that said portion of text selected by said user comprises computer software documentation:
searching for computer software code with at least one matching association key; and
altering the display of said computer software code with said at least one matching association key.

2. The computer-implementable method of claim 1, further comprising:
receiving a display list from said user, wherein said display list indicates the type of computer software documentation that said user wants displayed; and
suppressing the step of altering the display of said computer software documentation with said at least one matching association key in response to determining that the type of said computer software documentation with said at least one matching associate key is not indicated in said display list.

3. The computer-implementable method of claim 1, wherein said association keys comprise markup language tags.

4. The computer-implementable method of claim 1, further comprising:
in response to said user modifying a portion of said computer software code, prompting the user to modify said software documentation that corresponds to the modified portion of said computer software code.

5. A system comprising: a processor; a data bus coupled to the processor; a memory coupled to the data bus; and a tangible computer-usable medium embodying computer program code, the computer program code comprising instructions executable by the processor and configured for: receiving a portion of computer software code selected by a user of a computer system; inserting one or more association keys in at least one line of said portion of computer software code selected by said user, wherein said one or more association keys are used to identify a portion of computer software documentation that corresponds with said computer software code; receiving computer software documentation from said user corresponding to said portion of computer software code selected by said user; inserting one or more association keys in at least one line of said computer software documentation received from said user, wherein said one or more association keys are used to identify a portion of computer software code that corresponds with said computer software documentation; receiving a portion of text selected by a user; retrieving association keys in said portion of text selected by said user; determining whether said portion of text selected by said user comprises computer program code or documentation; in response to determining that said portion of text selected by said user comprises computer software code: searching for computer software documentation with at least one matching association key; and altering the display of said computer software documentation with said at least one matching association key; and in response to determining that said portion of text selected by said user comprises computer software documentation: searching for computer software code with at least one matching association key; and altering the display of said computer software code with said at least one matching association key.

* * * * *